US008059656B1

(12) United States Patent
Telikepalli et al.

(10) Patent No.: US 8,059,656 B1
(45) Date of Patent: Nov. 15, 2011

(54) EXPEDITED RESOURCE NEGOTIATION IN SIP

(76) Inventors: Radha Telikepalli, Kanata (CA); Tadeusz Drwiega, Kanata (CA)

( * ) Notice: Subject to any disclaimer, the term of this patent is extended or adjusted under 35 U.S.C. 154(b) by 499 days.

(21) Appl. No.: 11/432,624

(22) Filed: May 12, 2006

(51) Int. Cl.
*H04L 12/28* (2006.01)
*H04L 12/56* (2006.01)

(52) U.S. Cl. ............... 370/395.2; 370/428; 455/403; 455/517; 709/226

(58) Field of Classification Search ............ 370/395.2, 370/395.21
See application file for complete search history.

(56) References Cited

U.S. PATENT DOCUMENTS

| 7,260,060 | B1* | 8/2007 | Abaye et al. | 370/230 |
| 2002/0142749 | A1* | 10/2002 | Muniere et al. | 455/403 |
| 2005/0036492 | A1* | 2/2005 | Hoffmann et al. | 370/395.2 |
| 2007/0064709 | A1* | 3/2007 | Holmstrom et al. | 370/395.2 |
| 2007/0218924 | A1* | 9/2007 | Burman et al. | 455/466 |

* cited by examiner

*Primary Examiner* — Daniel J Ryman
*Assistant Examiner* — Jae Y Lee
(74) *Attorney, Agent, or Firm* — Norton Rose OR LLP

(57) ABSTRACT

A method of expediting resource negotiation in a modified Session Initiation Protocol (SIP) reduces the number of messages exchanged for resource negotiation, thereby reducing the latencies involved in session setup. The method entails sending an INVITE message having a modified SIP header containing an indication that the originator's terminal seeks a fast session setup. The INVITE message further contains a list of all codecs available at the originator's terminal and how many of each type of media component are required. These codecs can be provided in an order of preference. The answerer (the called party in the case of VoIP) selects the codecs for the requested media types from the list of available codecs without engaging in a back-and-forth resource negotiation for the codecs. The result is that the session can be set up with merely 7 messages of which only 5 messages contribute to session setup, which provides quicker session setup than in the prior art.

17 Claims, 5 Drawing Sheets

EXPEDITED RESOURCE NEGOTIATION IN SIP

CROSS-REFERENCE TO RELATED APPLICATIONS

This is the first application filed for the present invention.

TECHNICAL FIELD

The present invention relates to communications networks and, in particular, to Session Initiation Protocol (SIP).

BACKGROUND OF THE INVENTION

Converged networks support several protocols, such as SIP, H.323, and H.248, which provide session control, although SIP is now emerging as the predominant protocol because it is easy to use and offers many useful features.

Session Initiation Protocol (SIP) is an application-layer signalling protocol for creating, modifying, and terminating sessions with one or more participants. These sessions can include Internet telephone calls (e.g. VoIP), multimedia distribution, and multimedia conferences.

SIP invitations used to create sessions carry session descriptions that enable participants to agree on a set of compatible media types. SIP uses elements called proxy servers to route requests to the user's current location, to authenticate and authorize users for services, to implement provider call-routing policies, and to provide various features to users. SIP also provides a registration function that enables users to upload their current locations for use by proxy servers.

The first proposed standard version of SIP (SIP Version 2.0) was defined in RFC 2543, and this protocol was further clarified in RFC 3261, both of which are hereby incorporated by reference.

When using SIP, several messages are exchanged end-to-end (e2e) or hop-by-hop (where a "hop" connects two SIP-processing network elements). The time required for a system to establish a connection between two endpoints to set up a communication path is known as the "session setup time". A minimal session setup time thus enhances user satisfaction, particularly for a service such as Internet telephony where customers (who are used to quick call setups times in PSTN and wireless) expect equally quick session setup time for VoIP.

SIP messages carry a SIP-based header and SDP-based session description. The header contains self-explanatory fields such as Message type, Access network, From, To, Via, Max-forwards, Call-ID, Required QoS preconditions, supported messages, content type and content, length, etc. The messages include a description based on SDP about media properties such as media type (e.g. voice, video, or text), bandwidth requirements, IP address, codecs (COder/DECoders), direction of flow, etc. For example, an INVITE message includes all the media requirements based on the capability of that particular end terminal. For example, the INVITE message can include a QoS requirement (e2e or segmented, i.e. only in the access network).

A typical end-to-end connection in a converged network involves end terminals (e.g. handsets, PDA's, computers, etc.), an access network (which can be wire-line, e.g. cable, DSL, LAN, or wireless, e.g. 3GPP/2, GPRS), a packet transport network (which can be public, private or carrier) and session control elements (e.g. softswitches, gateways, CSCF nodes, etc.).

The session control traffic is directed from one end user to the other through all these elements with some segments such as access and transport being shared with the media traffic. As negotiation options increase, so does the number of messages exchanged between two user terminals or equipment to set up a session. This may result in long session setup latencies and reduced user satisfaction. In legacy telephony, only three messages are used to set up a connection between two users with call setup latency in the range of a few milliseconds to a few seconds over dedicated or prioritized connections. That would be very difficult to achieve with present-day SIP due to the number of messages required to set up a session, particularly with a low-bandwidth access and links. This is particularly problematic for wireless access where bandwidth resources tend to be limited.

FIG. 1 schematically illustrates a typical SIP-based session setup in accordance with the prior art. In this session setup, a SIP pre-condition provides that the end user is not alerted until the resource reservation is completed on both ingress and egress networks. As shown in FIG. 1, a total of 12 messages are exchanged e2e for a successful setup with 4 messages of these 12 messages being used for resource reservation, namely PRACK (Counteroffer), 200 OK (PRACK), UPDATE (reservation complete), and 200 OK (UPDATE).

The offer/answer exchanges in SIP can be made reliable by using PRACK messages, as is described in RFC 3262. Reliability also ensures interoperability with the PSTN. The PRACK reliability mechanism mirrors the reliability mechanisms for 2xx final responses to INVITE. Those requests are transmitted periodically by the Transaction User (TU) until a separate transaction, ACK, is received that indicates reception of the 2xx by the user-agent client (UAC). The reliability for the 2xx responses to INVITE and ACK messages are end-to-end. In order to achieve reliability for provisional responses, reliable provisional responses are retransmitted by the TU with an exponential backoff and cease when a PRACK message is received. The PRACK request is similar to ACK, but for provisional responses. However, PRACK is a normal SIP message and, as such, its own reliability is ensured hop-by-hop through each stateful proxy. Unlike ACK, PRACK has its own response. If this were not the case, the PRACK Message could not traverse proxy servers compliant with RFC 2543 and RFC 3261.

FIG. 2 schematically illustrates an alternative SIP-based session setup in accordance with the prior art. This alternative is currently being proposed in the standards as a more efficient session setup. The number of messages required to set up the session is reduced by four to a total of only 8 messages. As shown in FIG. 2, however, this alternative setup requires that resources be reserved at the caller before the INVITE message is sent, thus potentially blocking any other incoming calls that might arrive during the session setup. Bandwidth is therefore potentially wasted because the callee might not be available while other calls are being blocked from reaching the caller.

Thus, it remains highly desirable to provide a method that expedites resource negotiation in SIP.

SUMMARY OF THE INVENTION

An object of the present invention is to provide a method that expedites resource negotiation in SIP. An originating terminal sends an offer message, such as an INVITE message, containing an indication in the SIP header that a fast session setup is desired. The offer message provides to the answering terminal a list of all of the originating terminal's media capabilities as well as an indication of which media capabilities the originating terminal requires for setting up the session, i.e. which types of media streams the originating terminal requires and how many of each type. The answering terminal selects media capabilities from the list of media capabilities provided in the offer message and then communicates the selected media capabilities back to the originating terminal, at which point the originating terminal releases any unselected media capabilities. This method reduces the number of messages required to set up the SIP session, i.e. reduces the number of messages exchanged to negotiate an allocation of resources for the session. Since resource negotiation is expedited, the session setup occurs faster than in the prior art.

Accordingly, an aspect of the present invention provides a method of initiating a communications session using a modified Session Initiation Protocol (SIP) between an originating terminal and an answering terminal. The method includes a step of sending an offer message having a modified SIP header comprising an indication that a fast session setup is sought. The offer message further includes a list of all media capabilities available at the originating terminal and a number of media streams required by the originating terminal for each type of media capability for initiating the session. The method also includes a step of enabling the answering terminal to select media capabilities from the list of all media capabilities available at the originating terminal. The method further includes a step of reserving resources at the answering terminal corresponding to the selected media capabilities.

Another aspect of the present invention provides a system enabling fast setup of a SIP session between a first SIP user and a second SIP user connected by both a signalling path and a media path. The system includes an originating terminal for enabling the first SIP user to send over the signalling path a modified SIP offer message comprising an indication that a fast session setup is sought, the offer message further comprising a list of all media capabilities available at the originating terminal and a number of media streams required by the originating terminal for each type of media capability for initiating the session. The system also includes an answering terminal for enabling the second SIP user to answer the offer message by selecting media, capabilities from the list of all media capabilities available at the originating terminal and reserving resources corresponding to the selected media capabilities, and by communicating the selected media capabilities to the originating terminal.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
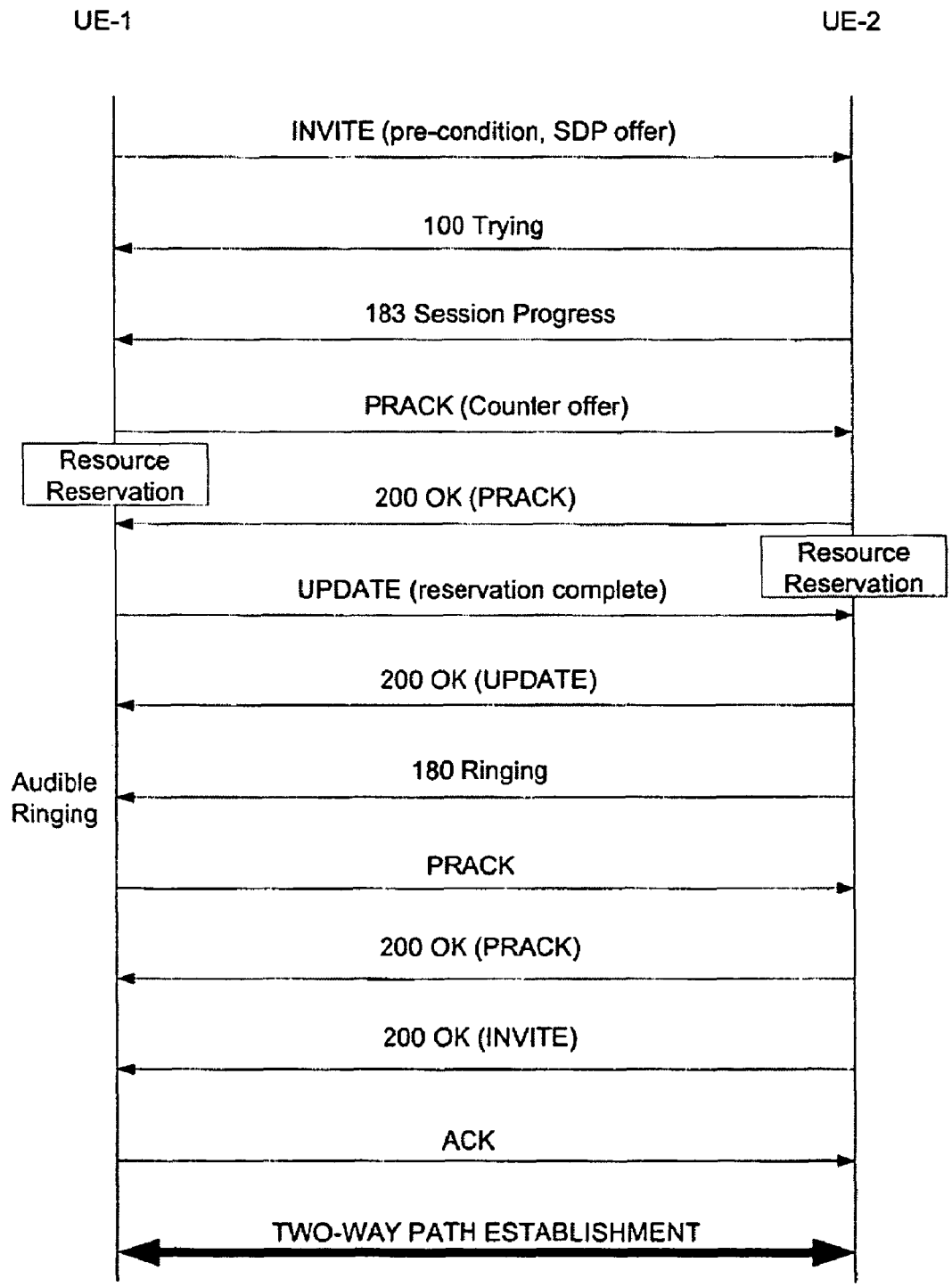
FIG. 1 is a schematic illustration of a SIP-based session setup in accordance with the prior art.
Figure 2:
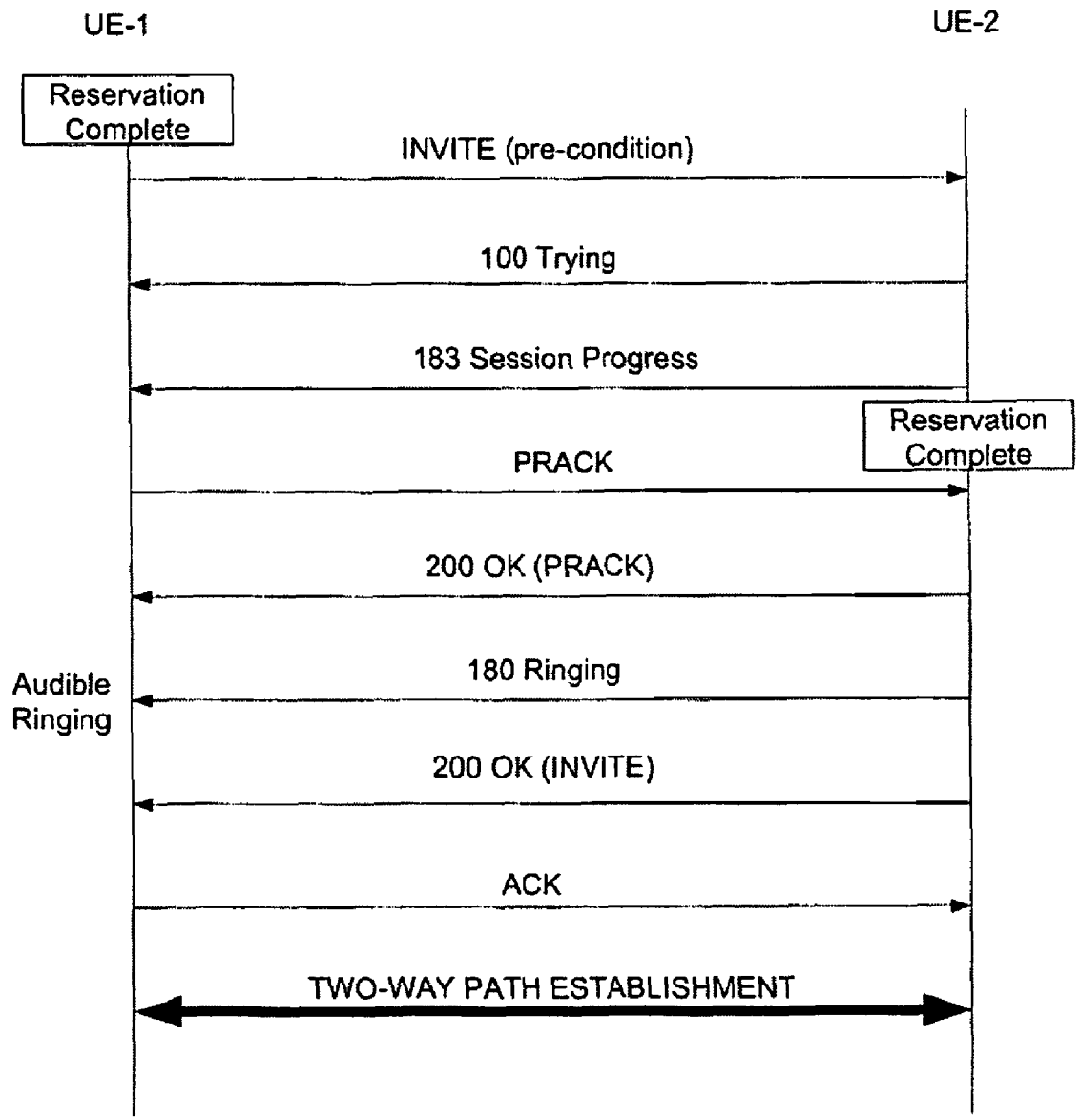
FIG. 2 is a schematic illustration of a more efficient SIP-based session setup in accordance with the prior art.
Figure 3:
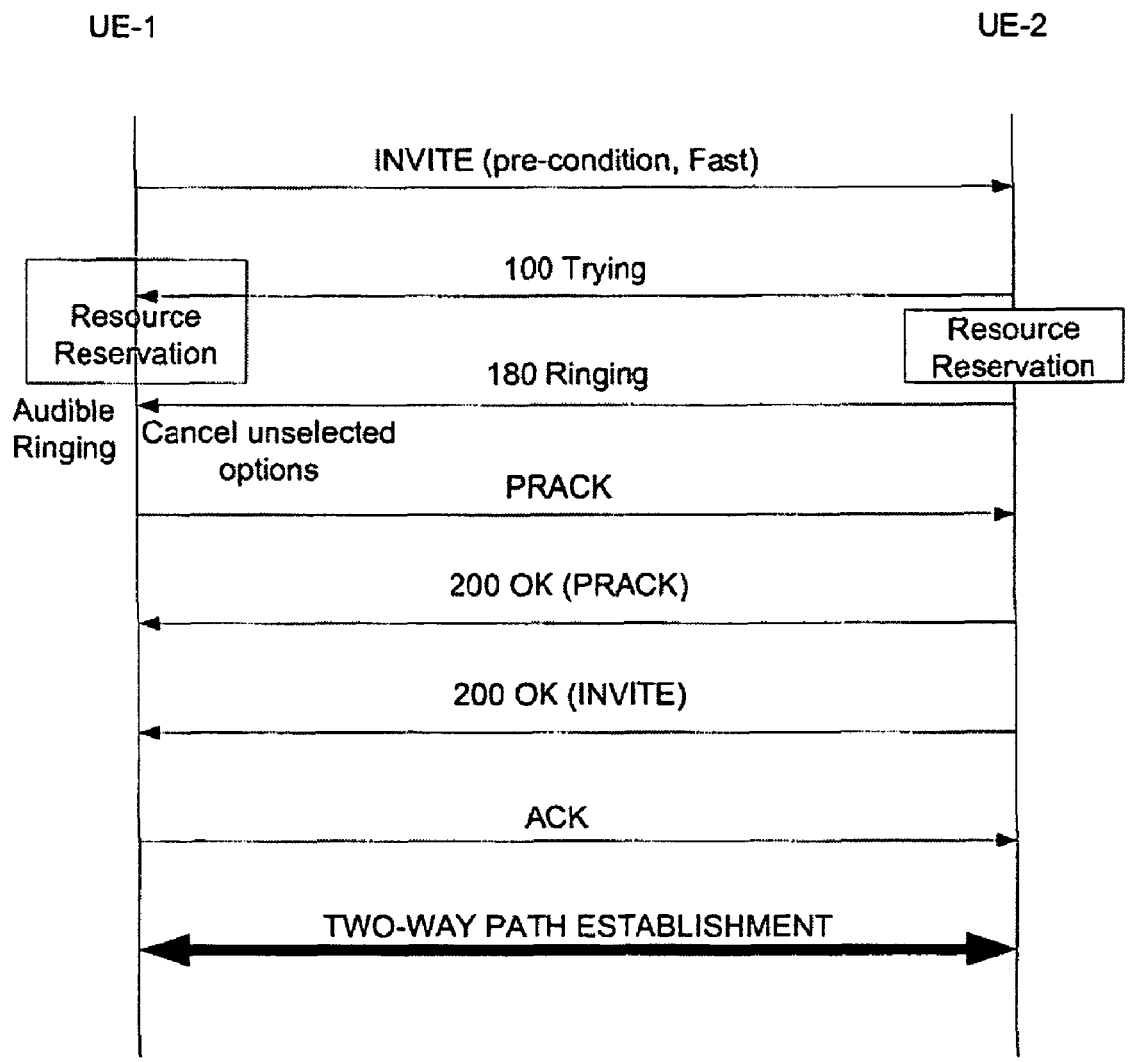
FIG. 3 is a schematic illustration of a method of expedited resource negotiation in SIP in accordance with an embodiment of the present invention.

As illustrated schematically in FIG. 3, a method in accordance with a preferred embodiment of the present invention enables fast session setup in Session Initiation Protocol (SIP) by reducing the number of messages that must be exchanged to set up a session between an originating terminal and an answering terminal. In other words, this novel method expedites resource negotiation in SIP by eliminating some of offer/answer messages that are exchanged using conventional SIP.

In this novel method, the SIP offer message provides to the answering terminal a full disclosure of all available media capabilities, preferably in order of the originating terminal's preference, from which the answering terminal selects media capabilities necessary to set up the session. Thus, the method provides a simplified negotiation mechanism whereby a prioritized offer of media options (capabilities) along with the originating terminal's session requirements (i.e. the number of media streams required by the originating terminal for each type of media capability for initiating the session) are presented in a single offer message to the answering terminal to enable the answering terminal to accept or reject the session based on its own available resources. In other words, upon receipt of the offer message containing the originating terminal's prioritized codecs and requirements for the session, the answering terminal can accept to initiate the session without having to engage in counteroffers or further resource negotiation. Thus, the novel method modifies SIP by eliminating the counteroffer mechanism which is conventionally used to negotiate resources between the offering (originating) terminal and the answering terminal. Instead, this modified SIP eliminates the need for counteroffers, which thus expedites resource negotiation.

The method shown in FIG. 3 expedites resource negotiation by modifying the SIP header to indicate that a fast session setup (or a fast call setup in the case of VoIP) is sought. The SIP header can be modified by inserting a tag, flag or field in the SIP header that provides an indicator to the answering terminal that fast session setup is sought.

As noted above, the SIP offer message also includes a list of all the media capabilities (also referred to herein as media options) available at the originating terminal. The media capabilities can include text, video, audio (voice) and audio (telephone events). The media capabilities/options can be identified in terms of available codecs (Coders/DECoders) capable of supporting the various media streams. As is known in the art, a "codec" is hardware or software that converts a signal into a format suitable for transportation using a specific set of protocols.

Preferably, the SIP offer message is an INVITE message, although the offer message could also be the subsequent 1XX message (in which case the terminal sending the 1XX offer message effectively becomes the originating terminal for the purposes of the method, i.e. the originator and answerer are inverted because the reply to the initial message effectively becomes the "offer"). In accordance with the preferred embodiment, the INVITE message lists all of the codecs capable of supporting the media capabilities available at the originating terminal. Preferably, the list of media capabilities is enclosed in Session Description Protocol (SDP). As, defined in RFC 2327, and hereby incorporated by reference, SDP is purely a session description, which typically includes the type of media (e.g. video, audio, etc), the transport protocol (e.g. RTP/UDP/IP, H.320, etc), and the format of the media (e.g. H.261 video, MPEG video, etc).

To recap, therefore, the originating terminal equipment sends an offer message (preferably an INVITE message) to the answering terminal, the offer message containing an indicator in the SIP header that fast session setup is sought, and further containing (i) a list of all codecs (all media capabilities of the originating terminal, preferably prioritized in order of the originating terminal's preference) and (ii) the number and type of each of the media streams that are required by the originating terminal in order to set up the session. On receipt of the fast-setup INVITE message, the answerer (the called party in the case of VoIP) selects media options from the list of codecs presented in the offer message). Since all options are presented in the offer message, further negotiation or making or soliciting counteroffers becomes unnecessary as the originating terminal harbors no additional options beyond those already presented in the offer message.

As described above, the SIP offer message (e.g. INVITE message) includes an indication of the types of media streams that are required for the particular session to be set up. For example, the INVITE message can present a breakdown of the required media components by type, e.g. audio: 1, video: 1, which would mean that the session requires 1 audio stream and 1 video stream (or alternatively 1 audio codec and 1 video codec). These media requirements, i.e. the identification of which media components or media streams are sought, can be inserted into the SIP header or alternatively conveyed in SDP. For example, if a terminal wants to use one audio stream for voice and one audio stream for telephone events (but not both at the same time), it would list all of the codecs available for audio (voice) connection under the first "m=" and another "m=" line with audio (telephone events). When the answerer receives the offer, it has to choose one from each audio line; however, due to the indication of a fast call/session setup and audio:1, it chooses the first codec that comes in the list, which in this case would correspond to the voice codec most preferred by the originating terminal.

FIG. 3 schematically illustrates the steps of setting up a session between an originating terminal (UE-1) and an answering terminal (UE-2) using a modified SIP method in accordance with a preferred embodiment of the present invention. As shown in FIG. 3, an INVITE message is sent by the originating terminal (user equipment #1) to the answering terminal (user equipment #2).

The INVITE message has a modified SIP header, as described above, containing, an indicator (tag, flag or field) to indicate that a fast session setup is desired. After the INVITE message is sent, by the originating terminal (UE-1), the originating terminal starts resource reservation for all the options/capabilities listed in the INVITE message.

Upon receipt of the INVITE message, the answering terminal UE-2 replies with a 100 Trying message destined to the nearest SIP processing network element (NE), selects the most favorable codec(s) corresponding to the required number of media components(s) and then starts its own resource reservation. Once the resources are successfully reserved, the answering terminal UE-2 alerts the end user (in the form of ringing for telephony or in the form of a visual display for other types of sessions) and then sends a 180 Ringing message containing the chosen media options.

Upon receipt of the 180 Ringing message, the originating terminal cancels all the connections (reservations) except the chosen ones identified in the 180 Ringing message. This triggers a ring-back (or other notification) to the end user to signal that the answerer/called party is available.

If the 180 Ringing message uses SIP-based reliability, then, as shown in FIG. 3, a hop-by-hop. PRACK message is sent by the originating terminal and a 200 OK (PRACK) message is sent by way of reply by the answering terminal.

As further shown in FIG. 3, when the called party answers, the answering terminal UE-2 sends a 200 OK (INVITE) message to which the originating terminal replies with an ACK message (both of which are sent end-to-end) at which point the media flow commences over the established two-way path.

Figure 4:
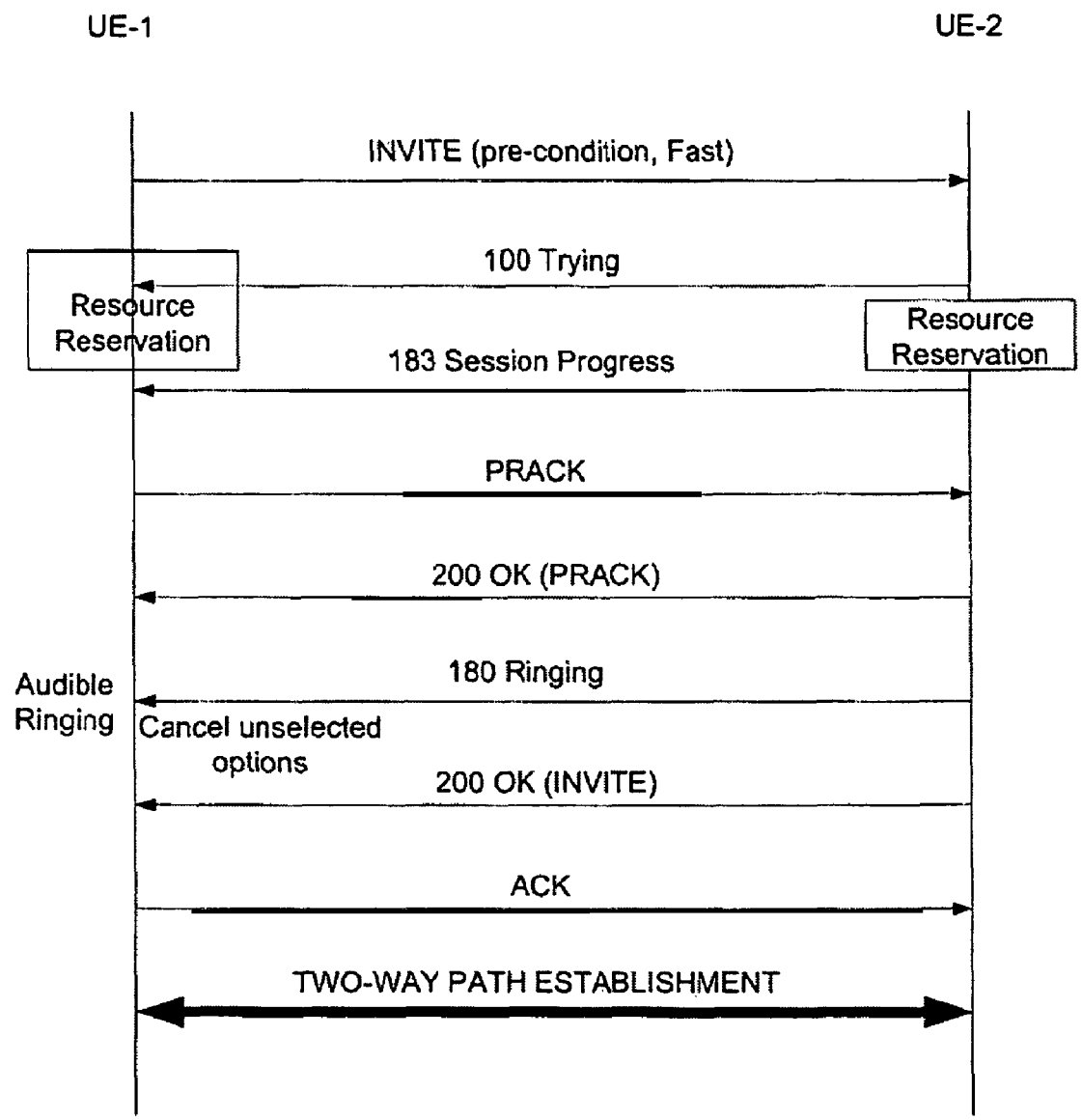
FIG. 4 is a schematic illustration of an alternative method of expedited resource negotiation in SIP in accordance with another embodiment of the present invention.

FIG. 4 schematically illustrates an alternative method of expedited resource negotiation in SIP in accordance with another embodiment of the present invention. As shown in FIG. 4, this alternative method includes a first step of sending an INVITE message containing an indicator (tag, flag or field) that a fast session setup is desired. The INVITE message also includes a list of all media capabilities, preferably in order of preference, as well as the originating terminal's media requirements (i.e. how many of each type of media stream needed to establish and support the session). Upon receipt of the INVITE message from the originating terminal UE-1, the answering terminal UE-2 replies with a 100 Trying message, picks media options from the list contained in the INVITE message, and begins resource reservation. These first steps, it will be observed, are the same as the first steps of the method schematically illustrated in FIG. 3.

As shown in FIG. 4, after replying with a 100 Trying message, the answering terminal sends a 183 Session Progress message to the originating terminal with the media options/capabilities selected by the answering terminal. (Selection of the codecs/media components proceeds in the same manner as was presented for the method shown in FIG. 3.) As noted above, resource reservation could begin at UE-1 after sending the INVITE message. Alternatively, resource reservation could commence only when the 183 message is received. The 183 message would in the latter case contain the options/capabilities selected by the answering terminal from the list of available options/capabilities provided in the INVITE message.

Reliability of the 183 Session Progress message can be guaranteed hop-by-hop with an exchange of PRACK and 200 OK (PRACK) messages. When both the resource reservation is complete and the 200 OK (PRACK) message has been sent, the end user is alerted by sending a 180 Ringing message to the originating terminal UE-1. Finally, when the called user answers, both parties exchange 200 OK (INVITE) and ACK Messages end-to-end, at which point the media flow begins over the established two-way path.

Variants on the foregoing embodiments, could involve determining some or all of the media capabilities of the terminals in alternate manners, for example, from logs of previous sessions, from terminal capability exchanges between the terminals prior to establishing a session (e.g. exchanging messages about what each terminal can support for different media), from a centralized entity that tracks/records information about the terminals, networks and the media features they can support, or from information about the ingress or egress access.

In certain cases, however, the session will fail to be set up, and in that case a failure message will be delivered to the originator's terminal. For example, a failure message from a session server situated in the called party domain will be delivered if the particular combination of media and codecs requested by the caller is not supported by the called party, i.e. the called party (UE-2) does not have those capabilities available. Alternatively, a failure message will be delivered where UE-2 decides it cannot, or does not want to, support that type of media at that time.

The foregoing methods expedite resource negotiation by reducing setup messaging and thus reduce the latencies involved in session setup. This results in faster call setup, reduced signalling load and enhanced user satisfaction. In addition, expedited negotiation also means that calls are less likely to be blocked because resources are not held up as long as in a conventional SIP setup. The foregoing methods are particularly useful for VoIP applications, where fast call setup is highly desirable. The method is also very useful for wireless networks because it minimizes the setup messaging traffic and thus reduces the burden of the limited bandwidth resources of the wireless network.

Figure 5:
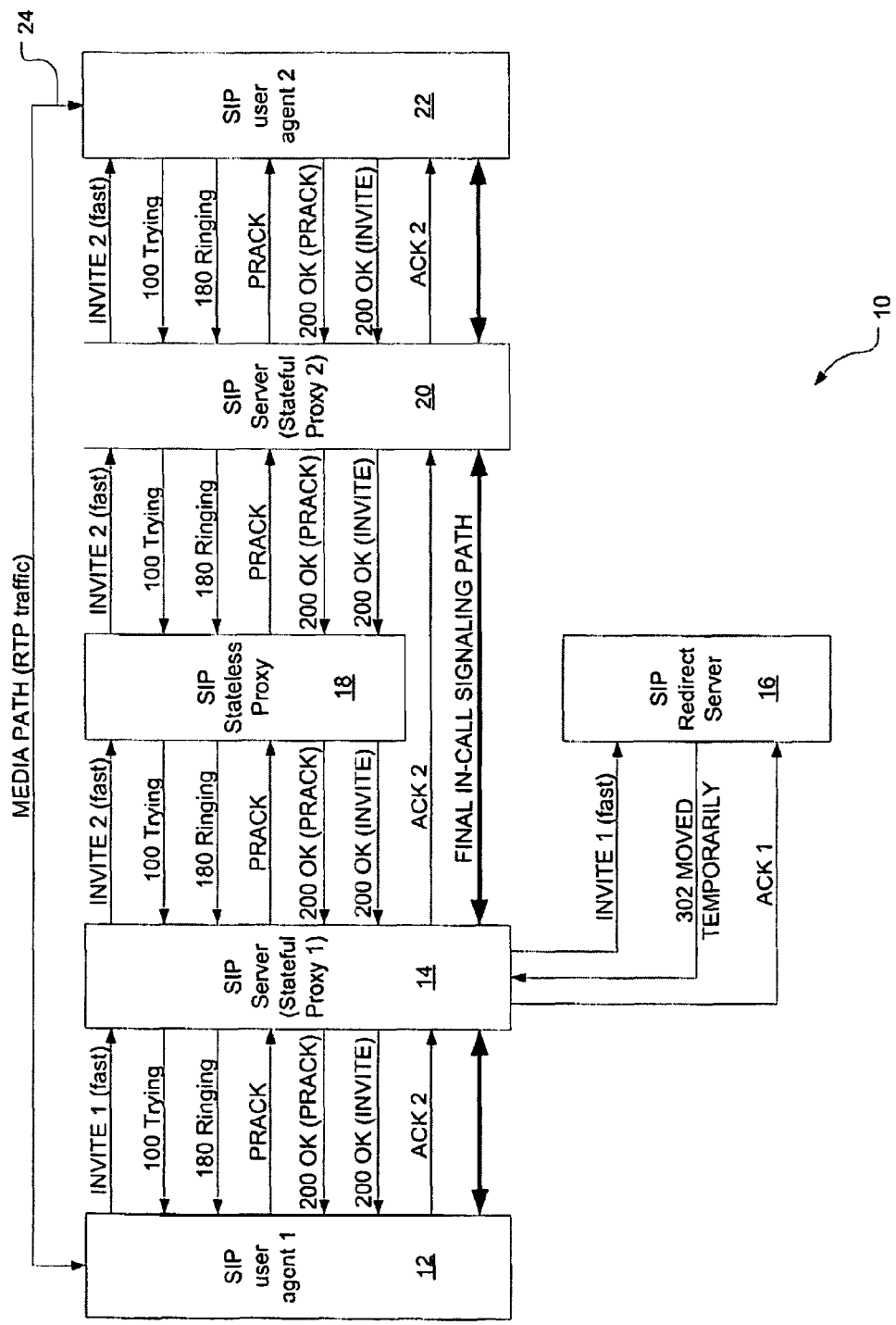
FIG. 5 is a schematic illustration of a system implementing modified SIP in accordance with another aspect of the present invention.

FIG. 5 schematically illustrates a system generally designated by reference numeral 10 enabling fast setup of a SIP session between a first SIP user and a second SIP user connected by both a signalling path and a media path. The system 10 includes an originating terminal 12 (designated in FIG. 5 as SIP user agent 1) for enabling the first SIP user to send over the signalling path a modified SIP offer message (e.g. an INVITE message) comprising an indication that a fast session setup is sought, the offer message further comprising a list of all media capabilities available at the originating terminal and a number of media streams required by the originating terminal 12 for each type of media capability for initiating the session.

As shown in FIG. 5, the system 10 also includes an answering terminal 22 (SIP user agent 2) for enabling the second SIP user to answer the offer message by selecting media capabilities from the list of all media capabilities available at the originating terminal 12 and reserving resources corresponding to the selected media capabilities, and by communicating the selected media capabilities to the originating terminal 12.

FIG. 5 also illustrates, by way of example only, how the system 10 can communicate its modified SIP INVITE message through both stateful and stateless proxies to an answering terminal (SIP user agent 2). As known in the art, stateless proxies "forget" about the SIP request once it has been forwarded whereas stateful proxies "remember" the request after it has been forwarded, so they can associate the response with some internal state. In other words, stateful proxies maintain transaction state while stateless proxies do not.

In the example shown in FIG. 5, the originating terminal 12 sends a modified INVITE message (INVITE 1) with a fast-setup indicator (tag, flag or field) to a first SIP server 14 (Stateful Proxy 1) which passes the INVITE 1 to the next hop, which by way of example only, is a SIP Redirect Server 16. In this example, the SIP Redirect Server 16 replies with an indication that SIP user agent 2 has temporarily moved which Stateful Proxy 1 acknowledges with an ACK 1 message.

Stateful Proxy 1 then resends a revised INVITE message, INVITE 2 (also containing a fast-setup indicator) to Stateless Proxy 18 which, in turn, forwards the INVITE 2 message to another SIP server 20 (Stateful Proxy 2) which, in turn, forwards the INVITE 2 message to SIP user agent 2 (i.e. the answering terminal 22).

As shown in FIG. 5, the 100 Trying, PRACK and 200 OK (PRACK) messages are exchanged hop by hop. An acknowledgement message (ACK 2) is then communicated from the originating terminal 12 to the answering terminal 22 (which bypasses the SIP Stateless Proxy 18, as shown in FIG. 5) which then establishes the final in-call signalling path (which also bypasses the SIP Stateless Proxy 18). Once the final in-call signalling, path is established, media (typically RTP traffic) can begin to flow over the media path 24.

The embodiments of the invention described above are intended to be exemplary only. The scope of the invention is therefore intended to be limited solely by the scope of the appended claims.

The invention claimed is:

1. A method of initiating a communications session using a modified Session Initiation Protocol (SIP) between an originating terminal and an answering terminal, the method comprising steps of:
   negotiating session requirements for the communications session, the negotiating including:
      sending an offer message having a modified SIP header comprising an indication that a fast session setup is sought, the offer message further comprising a list of all media capabilities available at the originating terminal and a number of media streams required by the originating terminal for each type of media capability for initiating the session; and
      enabling the answering terminal to select media capabilities from the list of all media capabilities available at the originating terminal provided in the offer message and in accordance with the number of media streams required by the originating terminal for each type of media capability;
   reserving resources at the answering terminal corresponding to the selected media capabilities; and
   answering the offer message by communicating the selected media capabilities to the originating terminal, wherein the originating terminal is enabled to release from reservation any unselected media capabilities.

2. The method as claimed in claim 1 wherein the offer message is an INVITE message.

3. The method as claimed in claim 1 wherein the offer message is a 1XX message.

4. The method as claimed in claim 1 wherein the step of answering the offer message comprises replying with a 180 Ringing message.

5. The method as claimed in claim 1 wherein the step of answering the offer message comprises replying with a 183 Session Progress message.

6. The method as claimed in claim 1 wherein the list of all media capabilities available at the originating terminal is enclosed in Session Description Protocol (SDP) as an inventory of all codecs available at the originating terminal.

7. The method as claimed in claim 1 further comprising steps of:
   sending a provisional response acknowledgement (PRACK) message hop-by-hop from the originating terminal to the answering terminal, the PRACK message being sent independently of any counteroffer; and
   sending a 200 OK (PRACK) message back to the originating terminal.

8. The method as claimed in claim 1 further comprising a step of determining media capabilities from logs of previous sessions.

9. The method as claimed in claim 1 further comprising a step of determining media capabilities from terminal capability exchanges between the originating and answering terminals prior to establishing the session.

10. The method as claimed in claim 1 further comprising a step of determining media capabilities from a centralized entity that tracks and records information about the terminals.

11. The method as claimed in claim 1 further comprising a step of determining media capabilities from information about an ingress access and/or an egress access.

12. A system enabling fast setup of a Session Initiation Protocol (SIP) session between a first SIP user and a second SIP user connected by both a signalling path and a media path, the system comprising:

an originating terminal for enabling the first SIP user to negotiate session requirements for the SIP session by sending over the signalling path a modified SIP offer message comprising an indication that a fast session setup is sought, the modified SIP offer message further comprising a list of all media capabilities available at the originating terminal and a number of media streams required by the originating terminal for each type of media capability for initiating the session; and an answering terminal for enabling the second SIP user to negotiate session requirements for the SIP session by answering the modified SIP offer message by selecting media capabilities from the list of all media capabilities available at the originating terminal provided in the modified SIP offer message and in accordance with the number of media streams required by the original terminal for each type of media capability and reserving resources corresponding to the selected media capabilities, and by communicating the selected media capabilities to the originating terminal, wherein, in response, the originating terminal is further enabled to release from reservation any unselected media capabilities.

13. The system as claimed in claim 12 wherein the modified SIP offer message is an INVITE message.

14. The system as claimed in claim 12 wherein the modified SIP offer message is a 1XX message.

15. The system as claimed in claim 12 wherein the answering terminal answers the modified SIP offer message with a 180 Ringing message containing the selected media capabilities.

16. The system as claimed in claim 12 wherein the answering terminal answers the modified SIP offer message with a 183 Session Progress message containing the selected media capabilities.

17. The system as claimed in claim 12 wherein the list of all media capabilities available at the originating terminal is enclosed in Session Description Protocol (SDP) as an inventory of all codecs available at the originating terminal.

* * * * *